United States Patent [19]

Yamane

[11] 4,071,309
[45] Jan. 31, 1978

[54] METHOD AND APPARATUS FOR MAKING CEMENT WITH PREHEATER, KILN AND HEAT EXCHANGER FOR HEATING COMBUSTION AIR

[75] Inventor: Isao Yamane, Ichikawa, Japan

[73] Assignee: Allis-Chalmers Corporation, Milwaukee, Wis.

[21] Appl. No.: 690,990

[22] Filed: May 28, 1976

[51] Int. Cl.² .......................... F27B 15/00; F27B 7/00
[52] U.S. Cl. ........................................ 432/14; 432/16; 432/106
[58] Field of Search ..................... 432/14, 15, 58, 106, 432/16

[56] References Cited

U.S. PATENT DOCUMENTS

| | | | |
|---|---|---|---|
| 3,452,968 | 7/1969 | Shimizu et al. | 432/16 |
| 3,940,241 | 2/1976 | Houd | 432/58 |

*Primary Examiner*—John J. Camby
*Attorney, Agent, or Firm*—Arthur M. Streich

[57] ABSTRACT

A method and an apparatus is disclosed for producing such as Portland cement from pulverant raw material in a system having at least a preheater and a rotary kiln. The preheater may be of the type having a series of stages each provided by a cyclone dust separator for successively preheating the raw material in a counter-flow of kiln waste gases and in which an identified one of the stages discharges a gas flow containing more thermal energy than can be used to advantage in preheating material in the remaining stages through which such gases must pass before dispersing in the surrounding atmosphere. A portion of the gases passing from the identified stage is diverted to a heat exchanger which utilizes the heat energy in such kiln waste gases to heat a clean stream of air. The thermal energy transfer to clean heated air is in turn delivered to the kiln and/or an auxiliary furnace connected to discharge into the kiln waste gas flow between the kiln and the identified stage, and such delivery of clean heated air provides heated combustion air for the burning of fuel in the kiln and/or auxiliary furnace.

8 Claims, 1 Drawing Figure

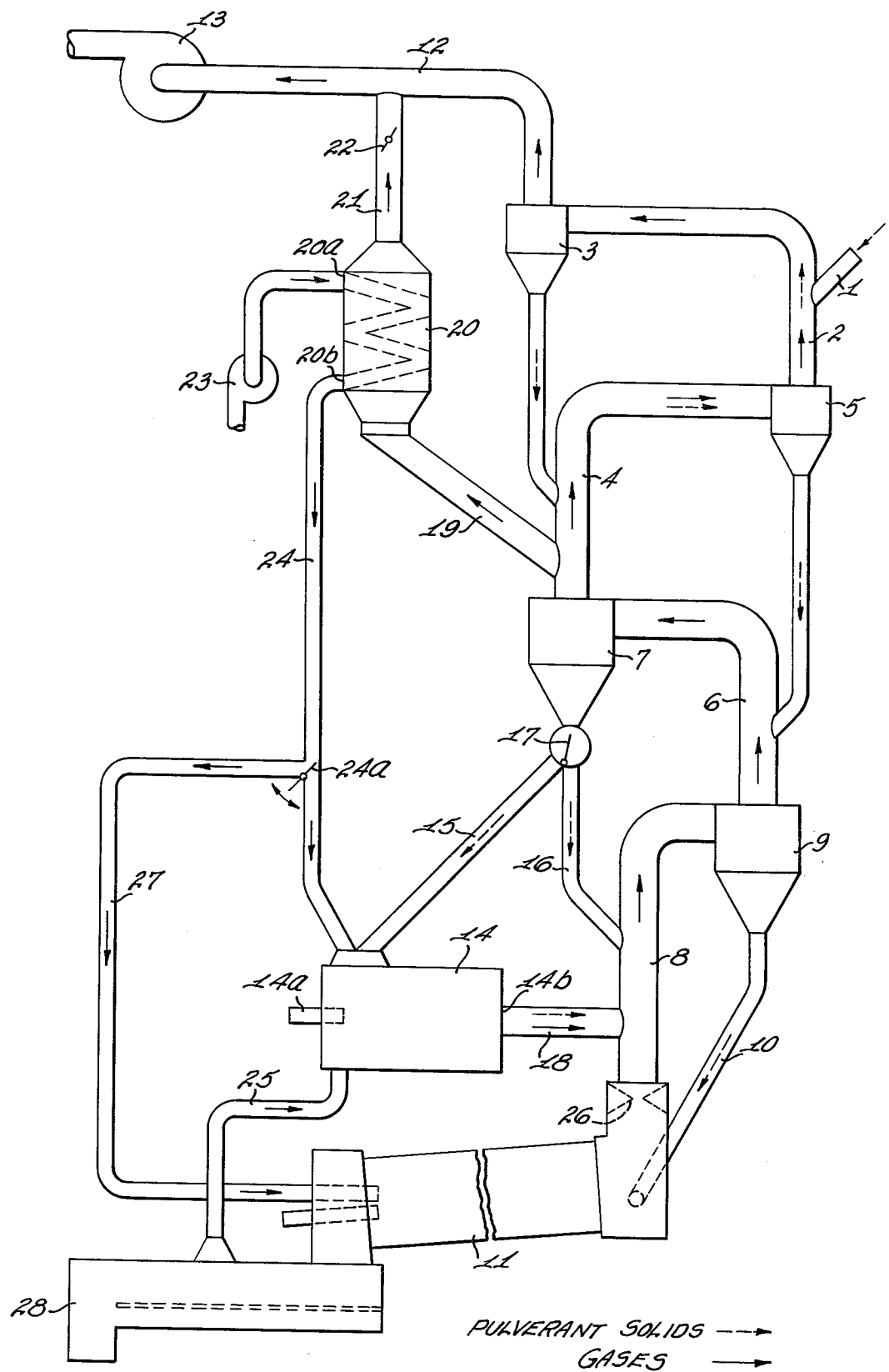

METHOD AND APPARATUS FOR MAKING CEMENT WITH PREHEATER, KILN AND HEAT EXCHANGER FOR HEATING COMBUSTION AIR

BACKGROUND OF THE INVENTION

1. Field of the Invention

This invention relates to methods and apparatus for preheating particulate feed material for a rotary kiln with heated exit gases from the kiln, as is utilized, for example, to produce Portland cement. In particular, this invention relates to such preheaters that comprise an assembly of cyclone dust separators and this invention may be applied to such a preheater having one or more auxiliary burners to additionally heat feed material after the feed material has been preheated but prior to the feed material entering the rotary kiln.

2. Description of the Prior Art

Preheaters for rotary kilns known to the prior art that involve preheating finely divided raw materials suspended in and moving generally counter to the flow of heated kiln exit gases flowing through one or more cyclone dust separators are disclosed in such as Czechoslovakian Pat. No. 48,169 of 1934; published German patent application K 156,877 of 1940; U.S. Pat. Nos. 2,648,532 and 2,663,560 of 1953; and many others such as are identified in U.S. Pat. No. 3,441,258 of 1969.

Preheaters of the aforementioned type but which are additionally provided with one or more auxiliary burners (projecting into a cyclone dust separator or an auxiliary furnace) to additionally heat feed material after the feed material has been preheated but prior to the feed material entering the rotary kiln are disclosed in patents such as U.S. Pat. Nos.; 3,235,239 of 1966; 3,452,968 of 1969; 3,507,482 of 1970; 3,752,455 of 1973; 3,834,860 and 3,843,314 of 1974; 3,869,248, 3,873,331, 3,881,862, 3,891,382, 3,891,383, 3,904,353, 3,910,754, 3,914,098, 3,925,091 and 3,926,651, all of 1975; and 3,932,116 and 3,932,117 of 1976.

It is known from the disclosure in the aforementioned U.S. Pat. No. 3,834,860 for a system developed by Onoda Cement Co., Ltd. of Japan, that the heat efficiency of preheaters of the aforementioned types can be improved by recovering the hot waste air from the cooler of a cement plant, and that the stability of the preheater with an auxiliary furnace using such air to support combustion of fuel, improves with the increase of the temperature of the said hot waste air. However, the hot waste air from the cooler cannot be used efficiently in all cases because the length of the hot air duct from the cooler to the auxiliary furnace sometimes must be of a length almots equivalent to that of the kiln because in the design of the plant it is inevitably necessary to install the auxiliary furnace at a considerable distance from the cooler. In addition, the high abrasion effect of the fine suspended particles of clinker contained in the waste air from the cooler calls for special abrasion preventive measures and makes it impractical to install in the duct a blower which is highly vulnerable to the said abrasion effect. It is further known from the prior art and disclosed for example in U.S. Pat. No. 3,869,248 that a throttle resistance may be provided within the flue connected to the outlet of the kiln gas to make use of the suction force of a blower taking suction from a first stage cyclone separator to draw hot air from the cooler into the preheater. However, the installation of the throttle resistance has the disadvantage of increasing both the air flow resistance and the power consumption of the suction blower.

The waste air from the cooler can be efficiently used for drying the raw materials depending upon the design of the cement manufacturing device, but when that is done, waste air from the cooler is not available to be supplied to the auxiliary furnace of the preheater. Further, in other special cases where air cooling of clinker is not the way clinker is cooled, no hot waste gas from the cooler is available for use either in the kiln or in the auxiliary furnace of the preheater.

The waste gas discharged to the atmosphere from a preheater used for cement manufacturing usually has a temperature of approximately 350° C., which is ascribable to the fact that the sensible heat of the waste gas brought from the pre-sintering range to the preheating range is far higher than is required for preheating the raw materials to the pre-sintering temperature. Unless the volume of such waste combustion gas is decreased, therefore, increase of the preheating ranges does not result in the decline of the gas temperature at the preheater outlet to the neighborhood of the inlet material temperature and such gas temperature above material inlet temperature represents wasted heat energy.

SUMMARY OF THE PRESENT INVENTION

In view of the foregoing, it is the primary object of the present invention to provide a method and an apparatus of the aforesaid type that includes an auxiliary furnace for pulverant pre-sintering which can be operated at a high efficiency by recovering, with a heat exchanger that extracts heat from kiln exit gases, the excess heat of the preheater within its preheating range and supplies this extracted excess heat to an auxiliary furnace for further heating preheated feed to pre-sintering temperatures or to both the auxiliary furnace and the kiln in cases where the use of the aforementioned hot waste gas from the cooler is either limited or totally impossible.

BRIEF DESCRIPTION OF THE DRAWING

The accompanying drawing shows diagrammatically a side elevation of an embodiment of the present invention with a cooler, rotary kiln, preheater, auxiliary furnace 14, and heat exchanger 20, all according to the present invention.

DESCRIPTION OF THE PREFERRED EMBODIMENT

Referring to the apparatus shown in FIG. 1, the raw materials fed from the supply pipe 1 to the flue 2 are dispersed and suspended in the ascending current of hot gas and are preheated before reaching the cyclone 3 (the solid arrow mark indicates the flow direction of the hot gas and the dotted arrow mark that of the raw materials). The raw materials collected by the said cyclone 3 fall down to the flue 4, and are further preheated until they are carried to the cyclone 5 by the ascending current of hot gas. These preheating and falling processes are repeated in the flue 6, cyclone 7, flue 8 and cyclone 9 until the raw materials are fed to the kiln 11 through the supply pipe 10.

The waste gas from the kiln 11, on the other hand, passes successively through the flues 8, 6 and 4 and the cyclones 9, 7, 5 and 3, and is sucked by the blower 13 through the outlet flue 12. As much as has so far been described has been known in this art, see for example U.S. Pat. No. 2,663,560 of 1953.

According to the present invention, the raw materials from the cyclone 7 are supplied to the auxiliary furnace 14 and the flue 8 through the director damper 17 and the chutes 15 and 16. It is possible to supply the whole quantity of the raw materials to the flue 8 through the chute 16 if the auxiliary furnace 14 is not used, or to the auxiliary furnace 14 through the chute 15 if the auxiliary furnace 14 is to be used to the maximum extent.

The combustion gas and the raw materials from the auxiliary furnace 14 are sent to the flue 8 through the flue 18 and mixed with the waste gas from the kiln. The feed rate of the raw materials to the auxiliary furnace 14 is determined by the model and type of the kiln.

A feature of the present invention is that part of the waste gas is extracted from the lower part of the outlet flue 4 which projects upwardly of the cyclone 7 and this extracted gas is led to a heat exchanger 20 through a flue 19 in order to recover the aforementioned surplus sensible heat of waste gas not needed in order to preheat raw material. The heat exchanger 20 is fed with the pressurized air which is supplied by the blower 23 in the direction counter to the waste gas flow direction, and the air thus preheated is supplied to the auxiliary furnace 14 through the duct 24 for burning fuel or, under the control of a damper 24a, to the burning end of the kiln through the duct 27 in such special cases where the aforementioned air cooling of clinker is not conducted. The waste gas from the kiln 11 extracted from flue 4 to heat exchanger 20 flows through the flue 21 and the damper 22 and reaches the flue 12 where it is mixed with the waste gas from the cyclone 3. Since the total air flow resistance through the flues 19 and 21 and the heat exchanger 20 is extremely small when compared to the total air flow resistance through the flues 4 and 2 and the cyclones 5 and 3, the gas flow rate through the heat exchanger 20 can be controlled by regulating the damper 22 without using any blower and the said damper 22 may be of a simple structure because it can be used in the low temperature waste gas. That the flow rate of the high temperature gas through the heat exchanger 20 can be thus readily controlled by resorting to the large suction force created by the air flow resistance through the cyclones 5 and 3 and the flues 4 and 2 is another feature of the present invention.

Another advantageous feature of the present invention is that the blower 23 can be obtained at low cost because it is intended to pressurize clean air held at the ambient temperature at all times and, in addition, it can readily meet a very high pressure requirement which must be filled depending on the type of the auxiliary furnace. This feature cannot be expected if the cooler waste air containing highly abrasive dust is to be used.

Further features and advantages of the invention will appear from the description given below.

When the cooler waste gas is to be supplied to the auxiliary furnace 14 through the duct 25 without using a blower in duct 25, a throttle 26 needs to be provided on the bottom of the flue 8 as hereinbefore mentioned in the discussion of prior art because the flow resistance through the kiln 11 is not large enough to cause blower 13 to draw a sufficient suction force to draw gases and solids through auxiliary furnace 14, flue 18 and into flue 8; and, as a result, it ordinarily becomes necessary for the blower 13 to produce a pressure large enough to draw raw material into flue 8 from the auxiliary furnace 14 and overcome the resistance due to the throttle 26. According to an aspect of this invention, however, the blower 13 is not required to produce the said increased suction pressure because of the pressurized and heated air from exchanger 20 acting to push raw material through furnace 14 and into flue 8.

Further, when an auxiliary furnace 14 is attached to an existing preheater to increase the production, the pressure loss of the preheater rises because the waste gas quantity natuarally increases in proportion to the increase of production. According to another aspect of the present invention, the rise of pressure loss due to the increase of production can be reduced by maintaining the air flow rate through the cyclones 5 and 3 at the same level even after the said installation of a new auxiliary furnace; which can be done because of the bypass of waste gas around cyclones 5 and 3 through flue 19, heat exchanger 20 and flue 21.

Results of calculations which relate to the cement sintering device of the present invention are shown below.

Waste gas extraction rate from flue 4, approximately — 21%

Preheating air volume — 0.3 $Nm^3$/kg (clinker)

Waste gas temperature — 740° C. at the inlet 19 to the heat exchanger 20, 380° C. at the outlet 21 from the heat exchanger 20, 309 C. at the outlet 12 from the cyclone 3, 325° C. at the inlet of the blower 13

Preheating air temperature — 0° C. at the inlet 20a of the heat exchanger 20, 400° C. at the outlet 20b of the heat exchanger 20

Heat recovered from waste gas by air passing through heat exchanger — 37.2 Kcal/kg (clinker)

In the foregoing explanation of the invention, it is stated that the waste gas is to be extracted from the outlet of the cyclone 7, but it can, of course, be extracted from the outlet of the cyclone 5.

The method and the apparatus of the present invention, specific embodiments thereof are described above, are applicable to the pre-sintering of not only the raw cement materials but also similar pulverized or granule substances including gypsum.

The embodiments of the invention in which an exclusive property or privilege is claimed are defined as follows:

1. A method of producing such as Portland cement clinker in a system including at least a preheater and a rotary kiln, with the cement being made from pulverant feed material pre-sintered in the preheater and then fed to the rotary kiln, with said pulverants being pre-sintered in a counterflow of kiln waste gases passing through multi-stages (3, 5, 7 and 9) of raw material preheating in the preheater, and in which a flow (e.g., in flue 4) of said kiln waste gases from an identified one of said stages (e.g., stage 7) contains more thermal energy than can be utilized to advantage in preheating the raw material in the remaining stages (e.g., stages 5 and 3) through which such gases pass before dispersing in surrounding atmosphere, said method comprising the steps of:

a. extracting from said flow (e.g., in flue 4) of gases from said identified stage (e.g., 7) a portion of such gases;

b. conducting such extracted gases to pass through a heat exchanger (20) into which air is introduced at a temperature lower than the temperature of the extracted gases to thereby transfer heat energy to such air while discharging the extracted gases and such air from the heat exchanger (20) in separate and unmixed streams (via 21 and 24); and c. recycling the heat energy transferred to such air from said extracted gases by delivering and introducing such heated air to the system (via 24, 14, 18 or 24, 27) at a location within the system where material feed has at least passed through said identified stage (e.g., 7) but has not yet passed out of the kiln (11).

2. A method according to claim 1 in which the recycled heat energy in the heated air is introduced (via 24, 27) at the material discharge end of the kiln (11) as preheated combustion air for fuel burned in the kiln.

3. A method of producing such as Portland cement clinker in a system including at least a preheater including an auxiliary furnace (14), a rotary kiln, with the cement being made from pulverant feed material pre-sintered in the preheater, fed to the rotary kiln, with said pulverants being pre-sintered in a counterflow of kiln waste gases passing through multi-stages (3, 5, 7 and 9) of raw material preheating in the preheater, and in which flow (e.g., stage 7) contains more thermal energy than can be utilized to advantage in preheating the raw material in the remaining stages (e.g., stages 5 and 3) through which such gases pass before dispersing in surrounding atmosphere, said method comprising the steps of:
 a. directing at least a portion of the feed material emitted from the identified stage (e.g., 7) to said auxiliary furnace (14);
 b. extracting from said flow (e.g., in flue 4) of gases from said identified stage (e.g., 7) a portion of such gases;
 c. conducting such extracted gases to pass through a heat exchanger (20) into which air is introduced at a temperature lower than the temperature of the extracted gases to thereby transfer heat energy to such air while discharging the extracted gases and such air from the heat exchanger (20) in separate and unmixed streams (via 21 and 24);
 d. delivering the heat energy transferred to such air from said extracted gases by delivering and introducing such heated air to the auxiliary furnace (14) as preheated combustion air for fuel burned in the auxiliary furnace; and
 e. delivering pre-sintered feed material and combustion gases from the auxiliary furnace to a location within the system where material feed has at least passed through said identified stage but has not yet passed out of the kiln.

4. A method according to claim 3 in which feed material and combustion gases from said auxiliary furnace (14) are mixed with kiln exit gases (e.g., in flue 8) that have not yet passed into said identified stage (e.g., 7).

5. An apparatus for producing such as Portland cement clinker with the apparatus including at least a preheater, a rotary kiln and a blower (13) connected to the preheater to draw kiln waste gas therethrough in which pulverant feed material is pre-sintered in the preheater and then fed to the rotary kiln, with said preheater having multi-stages (3, 5, 7 and 9) in which pulverants are pre-sintered in a counterflow of kiln waste gases which pass through said multi-stages (3, 5, 7 and 9) and then into an inlet (12) of said blower (13), and having one of said stages (e.g., stage 7), identified as discharging a flow of kiln waste gases that contains more thermal energy than can be utilized to advantage in preheating the raw material in the remaining stages (e.g., stages 5 and 3) through which such gases pass before reaching said inlet (12) of said blower (13), with an improvement comprising:
 a. a heat exchanger (20) having an inlet (20a) for air at atmospheric temperature, an outlet (20b) for discharging the inlet air after heat absorbing travel therethrough, an inlet (19) for kiln waste gas connected to a kiln waste gas outlet (4) of said identified stage (e.g., 7), an outlet (21) for kiln waste gas after heat transferring travel through the heat exchanger (20) and with the outlet (21) being connected to the inlet (12) of the blower (13), and a damper (22) in the kiln waste gas outlet (21) for regulating the portion of kiln waste gas drawn through the heat exchanger (20) by the blower (13);
 b. a duct arrangement (e.g., 24, 14, 18 or 24, 27) connected on one end to the heat exchanger heated air outlet (20b) and on a second end thereof to the apparatus at a location where feed material has at least passed through said identified stage (e.g., 7) but has not yet passed out of the kiln (11); and
 c. a blower (23) connected to the heat exchanger air inlet (20a) operative to blow atmospheric air through the heat exchanger (20) for absorbing heat energy from the kiln waste gases passing therethrough and recycling such heat energy to the apparatus through said duct arrangement (e.g., 24, 14, 18 or 24, 22).

6. An apparatus according to claim 5 in which the second end of the duct arrangement (e.g., 24, 27) is connected to the material discharge end of the kiln for utilization of the recycled heat energy as preheated combustion air for fuel burned in the kiln.

7. An apparatus for producing such as Portland cement clinker with the apparatus comprising preheater including an auxiliary furnace (14), a rotary kiln (11) and a blower (13) connected to the preheater to draw kiln waste gases therethrough, in which pulverant feed material is pre-sintered in the preheater and then fed to the rotary kiln, with said preheater having multi-stages (3, 5, 7 and 9) in which pulverants are pre-sintered in a counterflow of kiln waste gases which pass through said multi-stages and then into an inlet (12) of said blower (13), and having one of said stages (e.g., stage 7) identified as discharging a flow of kiln waste gases that contains more thermal energy than can be utilized to advantage in preheating the raw material in the remaining stages (e.g., stages 5 and 3) through which such gases pass before reaching the inlet (12) of the blower (13), with an improvement comprising:
 a. a chute (15) connected to the material discharge of the identified stage (e.g., 7) for directing at least a portion of such discharge to the auxiliary furnace (14);
 b. a heat exchanger (20) having an inlet (20a) for air at atmospheric temperature, an outlet (20b) for discharging the inlet air after heat absorbing travel therethrough, an inlet (19) for kiln waste gas connected to a kiln waste gas outlet (4) of said identified stage (e.g., 7), an outlet (21) for kiln waste gas heat transferring travel therethrough which is connected to the inlet (12) of the blower (13), and a damper (22) in the kiln waste gas outlet (21) for regulating the portion of kiln waste gas drawn through the heat exchanger (20) by the blower (13);

c. a duct arrangement (24) connected on one end to the heat exchanger heated air outlet (20b) and on a second end thereof to the auxiliary furnace (14);

d. a flue (18) connecting a pre-sintered material and combustion gas outlet (14b) to a location (e.g., flue 8) in the system where feed material has at least passed through said identified stage (e.g., 7) but has not yet passed into the kiln (11); and e. a blower 23 connected to the heat exchanger air inlet (20a) operative to blow atmospheric air through the heat exchanger (20) for absorbing heat energy from the kiln waste gases passing therethrough and transferring such heat energy through said duct (24) to the auxiliary furnace (14) for use as preheated combustion air for fuel burned in the auxiliary furnace (14).

8. An apparatus according to claim 7 in which an adjustable damper (24a) is provided in the air flow passage through the said duct arrangement (24, 27 and 24, 14, 18) for selectively regulating the flow of air heated in the heat exchanger (20) to the kiln 11 and the auxiliary furnace (14).

* * * * *